Patented July 25, 1939

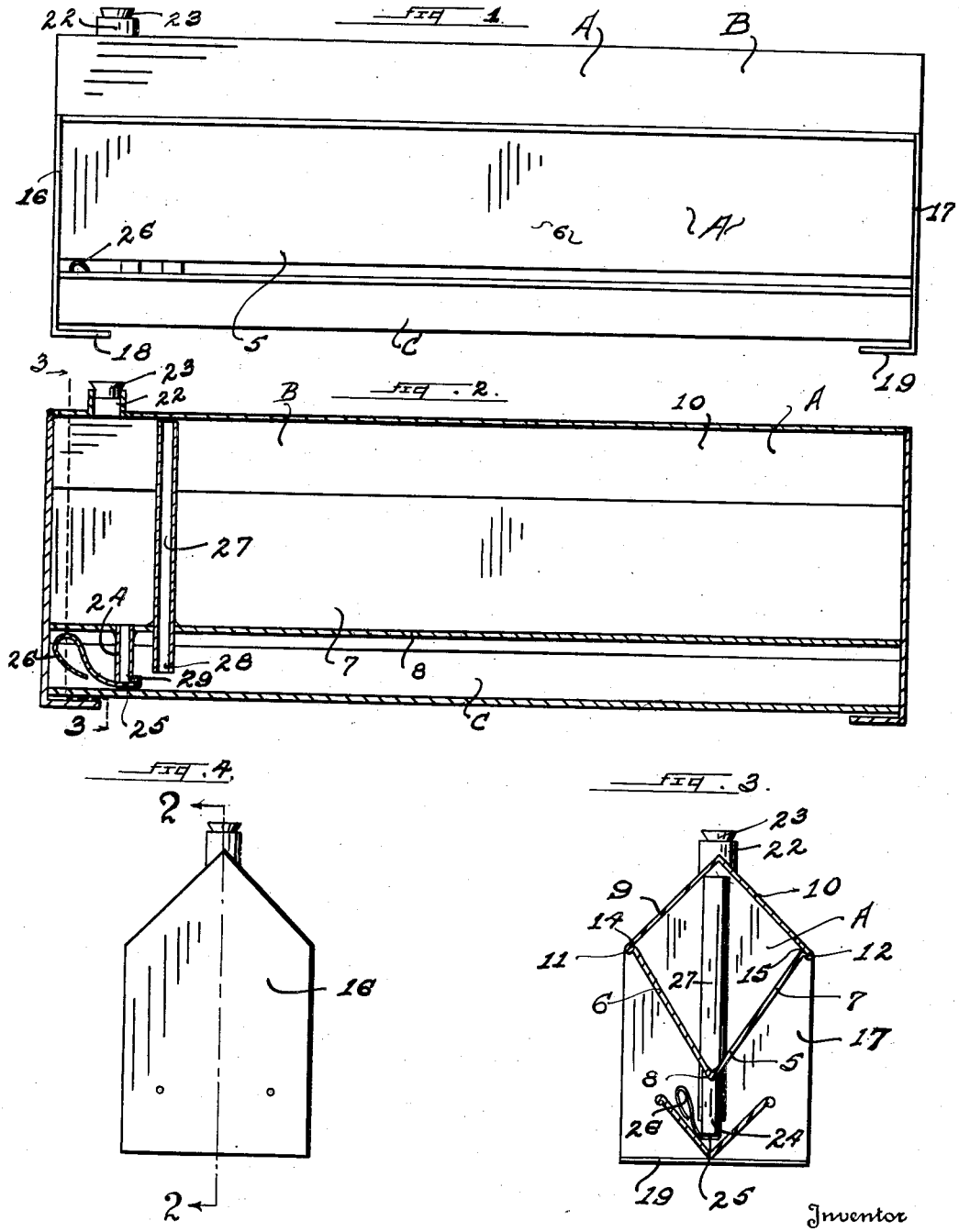

2,166,982

UNITED STATES PATENT OFFICE 2,166,982

SANITARY FOUNTAIN

George E. Wilson, Salt Lake City, Utah

Application May 19, 1936, Serial No. 80,472

1 Claim. (Cl. 119—77)

My invention relates to watering troughs and feeders and the like and has for its object to provide a new and efficient sanitary fountain watering trough for chickens and other poultry.

A further object is to provide a sanitary watering trough of the fountain type holding a supply of water and feeding the water down as needed into the trough in small amounts without sucking the dirt from the trough up into the storage reservoir.

A still further object is to provide a sanitary watering trough which has an overhanging roof on the water reservoir to prevent the droppings from the poultry from falling down into the watering trough.

A still further object is to provide a watering trough and fountain which is so constructed that when frozen in winter it will not break, due to the expansion and contraction construction and overlap of material used when making the eaves.

These objects I accomplish with the device illustrated in the accompanying drawing in which similar numerals and letters of reference indicate like parts throughout the several views and as described in the specification forming a part of this application and pointed out in the appended claim.

In the drawing in which I have shown my device,

Figure 1 is a side elevation of a watering trough made with my principle.

Figure 2 is a longitudinal section on line 2—2 of Figure 4 with the water discharge valve closed.

Figure 3 is a section on line 3—3 of Figure 2.

Figure 4 is an end view of the trough.

In the drawing in the simplified form for fountain watering troughs shown in Figures 1 to 4, I have shown my tank as made of a long tank A quadrangular in cross section made of a V-shaped base 5 composed of side walls 6 and 7 diverging from the lower apex 8 and then joined to the roof B. The two side slopes of the roof B shown as 9 and 10 are extended with a flange 11 and 12 beyond the extreme width of the side walls 6 and 7. This flange is formed by bending the sides of the roofs back upon themselves at 14 and 15. The material used to make the tank must be of light weight and rust proof, and may be joined together along either of the flanges at one side or the other. This construction of the tank A provides for an expansion joint along each side and makes the tank proof against breakage from freezing and thawing, which naturally causes expansion and contraction when the water freezes and thaws.

The ends for the water tank and trough are made of flat pieces 16 and 17 soldered or otherwise secured to the ends of the tank A with the top formed to fit the roof slope of the sides 9 and 10 and the bottom of each end piece is turned inwardly to form feet 18 and 19 respectively. Between these two ends and under the bottom of the tank A, I mount the drinking trough C. This trough C is made V-shaped with the width less than the distance between the eaves 11 and 12 formed by the flanges 14 and 15 of the tank A. The top of the tank is provided with a filling tube 22 and a rubber cork or filler 23 is provided to be forced into the tube when the tank is full to prevent leakage through the filling tube. The same end of the tank A is provided with the automatic trough filling device which consists first of a discharge tube 24 secured to the bottom of the tank A in open connection with the interior thereof and on the bottom of this I provide a closure valve. The type of valve shown in the drawing is a flat plate 25 pivotally connected to one side of the bottom of the discharge tube 24 and having a curved handle 26 formed by which the valve may be opened or closed as desired or necessary when filling the tank. As an air tube for the tank I provide a larger diametered tube 27 extending through the bottom of the tank A up to near the ridge of the top and extending down into the trough below the top level thereof but with the bottom end 28 of the tube spaced slightly above the bottom end 29 of the tube 24. This completes the water tank trough and controls.

The operation of this type of device is as follows:

The tank is first filled with clean water by closing the valve 25 over the end of the tube 24 and filling the tank through the filling tube 22. The rubber stopper or cork is then forced into the tube to prevent any leakage of air and water is allowed to flow from the discharge tube 24 into the trough C through the tube 24 by opening the valve 25. When sufficient water has flowed from the tube to fill the trough the air pressure on this water will automatically stop the flow of water from the tube. Now when the poultry using the trough have emptied the trough sufficient for air to enter the bottom end 28 of the tube 27, air will be allowed to pass up through the tube in small surges allowing the air to expand in the top of the tank through the top of the tube 27 and breaking the vacuum therein sufficient to allow a small quantity of water to flow from the discharge tube 24 into the trough C. This continues until the tank is empty. The tube 27 must preferably be made larger than the tube 24 and must be spaced higher from the bottom of the trough so that no dirt will enter the tube 27 with sufficient suction and turmoil to be drawn completely through the tube into the tank, but with each small surge of air up the tube, such dirt as may be present near the end of the tube will not be drawn completely through the tube but will rise a short distance in the tube and will fall back down into the trough. This construction of water feed and control provides a clean supply of water from the tank into the trough and eliminates the need of cleaning the tank, for if the person filling the tank is careful to use clean water there will never be any dirt in the tank A.

Having thus described my invention I desire to secure by Letters Patent and claim:

In a watering trough for chickens, the combination of a storage tank having the tank side made of one piece bent to form a tank quadrilateral in cross section with one angle at the top and a more acute angle at the bottom and with the outside edges formed into expansion and contraction eaves by bending the metal back upon itself; ends secured to said tank; a filling tube for said tank having a closure therefor; a V-shaped trough mounted between the ends under said tank with the width of the trough less than the distance between the eaves formed on the tank; a discharge tube leading from the bottom of the tank into said trough; an air control tube leading from the top of said tank into the water trough with the lower end spaced above the level of the lower end of the discharge tube; and means to shut off the discharge tube when filling the tank.

GEORGE E. WILSON.